United States Patent [19]

Yamada et al.

[11] Patent Number: 4,603,355
[45] Date of Patent: Jul. 29, 1986

[54] SOLID STATE IMAGE PICK-UP DEVICE

[75] Inventors: Hidetoshi Yamada, Tokyo; Akira Watanabe, Fuchu; Yoshimasa Kusazaki, Nagano; Yasuo Arisawa, Matsumoto; Yutaka Yunoki, Kunitachi, all of Japan

[73] Assignee: Olympus Optical Co., Ltd., Tokyo, Japan

[21] Appl. No.: 522,351

[22] Filed: Aug. 11, 1983

[30] Foreign Application Priority Data

Aug. 13, 1982 [JP] Japan ................. 57-139934

[51] Int. Cl.⁴ .............................................. H04N 3/14
[52] U.S. Cl. ................................................... 358/213
[58] Field of Search ............... 358/213, 212, 209, 41; 250/578; 357/24 LR

[56] References Cited

U.S. PATENT DOCUMENTS 4,010,319  3/1977  Levine ........................ 358/213
4,335,405  6/1982  Sakane et al. ................. 358/213

Primary Examiner—Gene Z. Rubinson
Assistant Examiner—Stephen Brinich
Attorney, Agent, or Firm—Parkhurst & Oliff

[57] ABSTRACT

A solid state image pick-up device includes a number of picture elements arranged in a matrix form each picture element being constituted by a MOS transistor and a photodiode, gates of the MOS transistors arranged in a vertical direction are connected to respective horizontal scanning lines which are connected to outputs of a horizontal shift register. Drains of the MOS transistors arranged in a horizontal direction are connected to respective vertical scanning lines both ends of which are connected to first and second signal read-out lines via first and second vertical selection switches, respectively. The first and second vertical shift registers produce first and second vertical scanning pulses which are shifted by given time period corresponding to a desired shutter open time. Each picture element is scanned twice by means of the first and second vertical scanning pulses. By adjusting said time period, the shutter open time can be set at with within a wide range.

3 Claims, 31 Drawing Figures

FIG_6

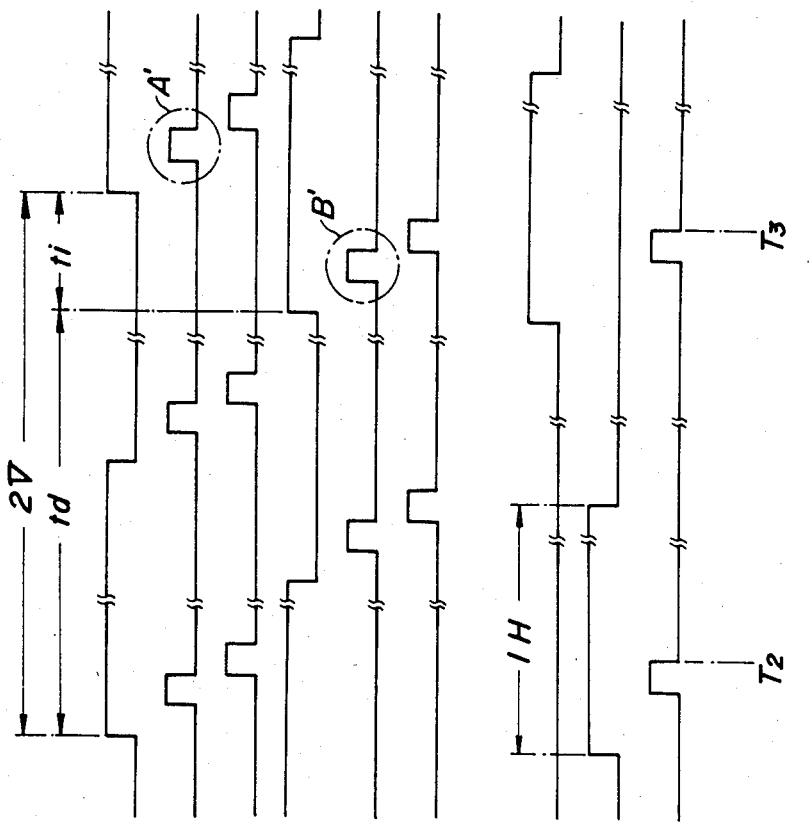

SOLID STATE IMAGE PICK-UP DEVICE

BACKGROUND OF THE INVENTION

The present invention relates to a solid state image pick-up device comprising a plurality of picture elements arranged in a matrix form, each having a MOS transistor and a photodiode, vertical and horizontal scanning lines for scanning the picture elements, vertical and horizontal shift registers for producing vertical and horizontal scanning pulses which drive the vertical and horizontal scanning lines, respectively, to read-out photoelectrically converted signal charge stored in the photodiodes onto a signal read-out line.

The solid state image pick-up device of the kind mentioned above operates under a so-called XY address system and has an electronic shutter function. Such a solid state image pick-up device can be manufactured by utilizing the well-developed MOS-IC technique and has been generally applied to small size video cameras.

FIGS. 1A and 1B illustrate an example of a known solid state image pick-up device. FIG. 1A shows schematically the whole construction of the device and FIG. 1B is a cross section depicting the construction of a single picture element. The image pick-up device comprises a number of picture elements 1-11, 1-12 ... ; 1-21, 1-22 ... ; ... arranged in a matrix form and formed in a p-type semiconductor substrate 1. Each of the picture elements comprises a MOS transistor having a source 2 and a drain 4 formed in a main surface of the substrate 1 and a gate 3 formed on an insulating layer applied on the main surface, and a n+p photodiode 5 constituted by a junction between the p-type substrate 1 and n+ source 2. In the source 2 is stored in signal charge whose amount corresponds to an incident light amount. To the gates 3 of the MOS transistors are applied vertical scanning pulses from a vertical shift register 6, while to the drains 4 of MOS transistors are connected horizontal selection switches 7-1, 7-2, ... comprising MOS transistors and horizontal scanning pulses are applied to the switches from a horizontal shift register 8 so as to connect selectively the drains 4 of MOS transistors to a video output line V.L. The horizontal scanning pulse has a frequency $f_H$ of 15.75 KHz and the vertical scanning pulse has a frequency fv of 30 Hz.

When the vertical scanning pulse is applied to the gate 3 of MOS transister constituting a picture element and, at the same time, the drain 4 of the related MOS transistor is selected by a horizontal selection switch 7 driven by the horizontal scanning pulse, the signal charge stored in the photodiode 5 is read-out onto the video output line V.L. At the same time, the photodiode 5 is reverse-biased or reset by a supply source $V_D$, so that the charge storing operation is started again.

In the known solid state image pick-up device explained above, the reading out operation and the reset operation are effected simultaneously, the charge storing period, i.e. the exposure time corresponding to a shutter open time is fixed to 1/fv=33.3 msec. and could not be made shorter than 1/fv.

In general, in case of picking-up a moving object, it is necessary to shorten the shutter open time in order to obtain a sharp image of the object. However, in the known pick-up device, since the shutter open time is fixed, when the moving object is picked-up, the image sharpness is decreased and the image quality becomes deteriorated to a great extent. In order to obviate such a drawback, it has been proposed to provide a high speed rotary shutter in a video camera or to ignite a stroboscopic lamp during a vertical blanking period. However, such a solution requires special devices, so that the camera is liable to be complicated in construction, large is size, heavy in weight and expensive in cost, and further usage of such a camera is limited in various ways.

SUMMARY OF THE INVENTION

The present invention has for its object to provide a novel and useful solid state image pick-up device in which an exposure time can be adjusted at will within a frame period to offer a variable electronic shutter function.

It is another object of the invention to provide a solid state image pick-up device having a variable electronic shutter function by means of which a sharp image of an object moving at a high speed can be obtained.

According to the invention, a solid state image pick-up device comprises;
   means having a number of picture elements arranged in a matrix form, each picture element including at least one MOS transistor and a photodiode;
   horizontal scanning means connected to said picture elements for scanning horizontally the picture elements at a given horizontal scanning period;
   vertical scanning means connected to said picture elements for scanning the picture elements at a given vertical scanning period; and
   signal reading-out means including first and second signal read-out lines selectively connected to the picture elements under the control of said horizontal and vertical scanning means in such a manner that signal charges stored in the photodiodes are read-out twice within a field period to perform a shutter function having a variable shutter open time.

BRIEF DESCRIPTION OF THE DRAWINGS

FIGS. 8A to 8I are waveforms for explaining the operation of the device illustrated in FIG. 7.

DESCRIPTION OF THE PREFERRED EMBODIMENTS

Figure 2:
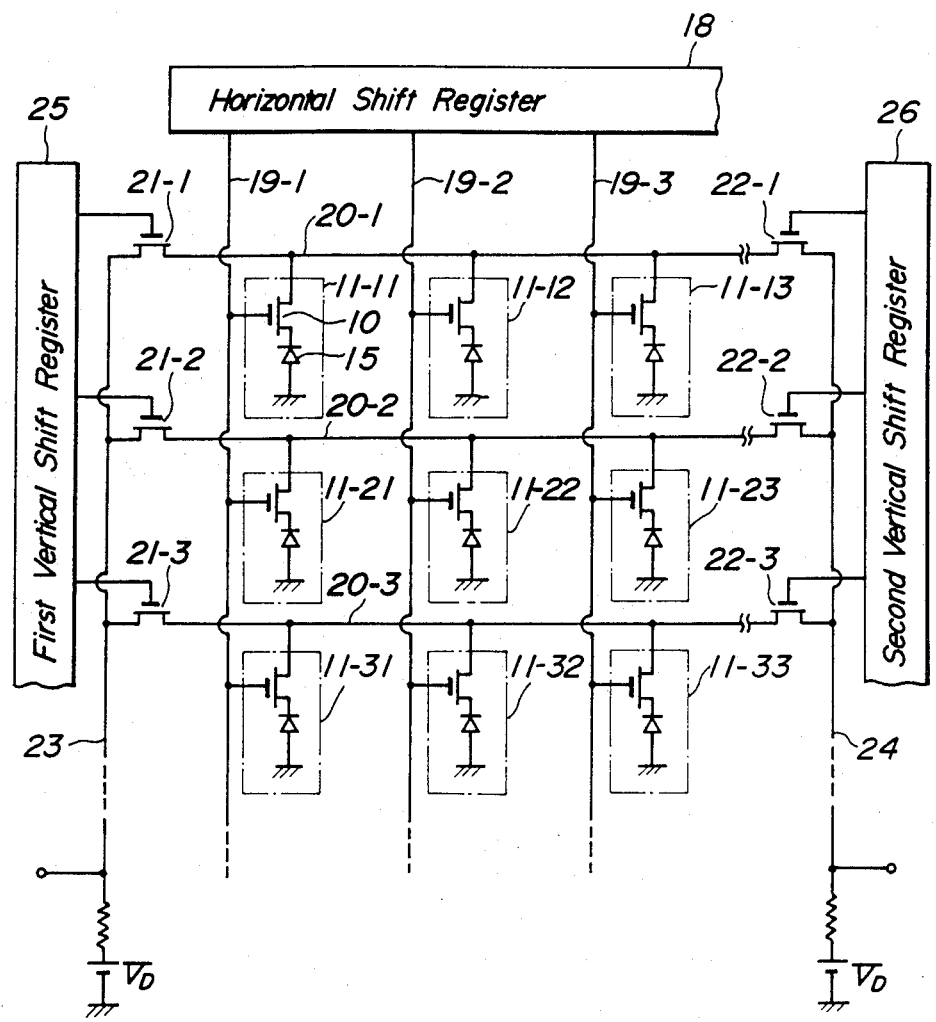
FIG. 2 is a circuit diagram showing a principal construction of the solid state image pick-up device according to the invention.

FIG. 2 is a circuit diagram showing an embodiment of the solid state image pick-up device according to the invention. The device comprises a number of picture elements 11-11, 11-12, 11-13 ... ; 11-21, 11-22, 11-23 ... ; 11-31, 11-32, 11-33 ... ; ... arranged in a matrix form. Each picture element comprises a MOS transistor 10 and a photodiode 15 formed at a source of the MOS transistor. Gates of MOS transistors arranged in the Y direction (vertical direction) are commonly connected to respective horizontal scanning lines 19-1, 19-2, 19-3 ... and drains of MOS transistors arranged in the X direction (horizontal direction) are commonly connected to respective vertical scanning lines 20-1, 20-2, 20-3 .... The horizontal scanning lines 19-1, 19-2, 19-3 ... are connected to outputs of a horizontal shift register 18 and both ends of the vertical scanning lines 20-1, 20-2, 20-3 ... are connected to first and second signal read-out lines 23 and 24, respectively through first vertical selection switches 21-1, 21-2, 21-3 ... and second vertical selection switches 22-1, 22-2, 22-3 ..., respectively. Each of the first and second vertical selection switches is formed by a MOS transistor. In the solid state image pick-up device there are further provided first and second vertical shift registers 25 and 26 whose outputs are connected to gates of the first and second vertical selection switches 21-1, 21-2, 21-3 ... and 22-1, 22-2, 22-3 ..., respectively.

Figure 3:
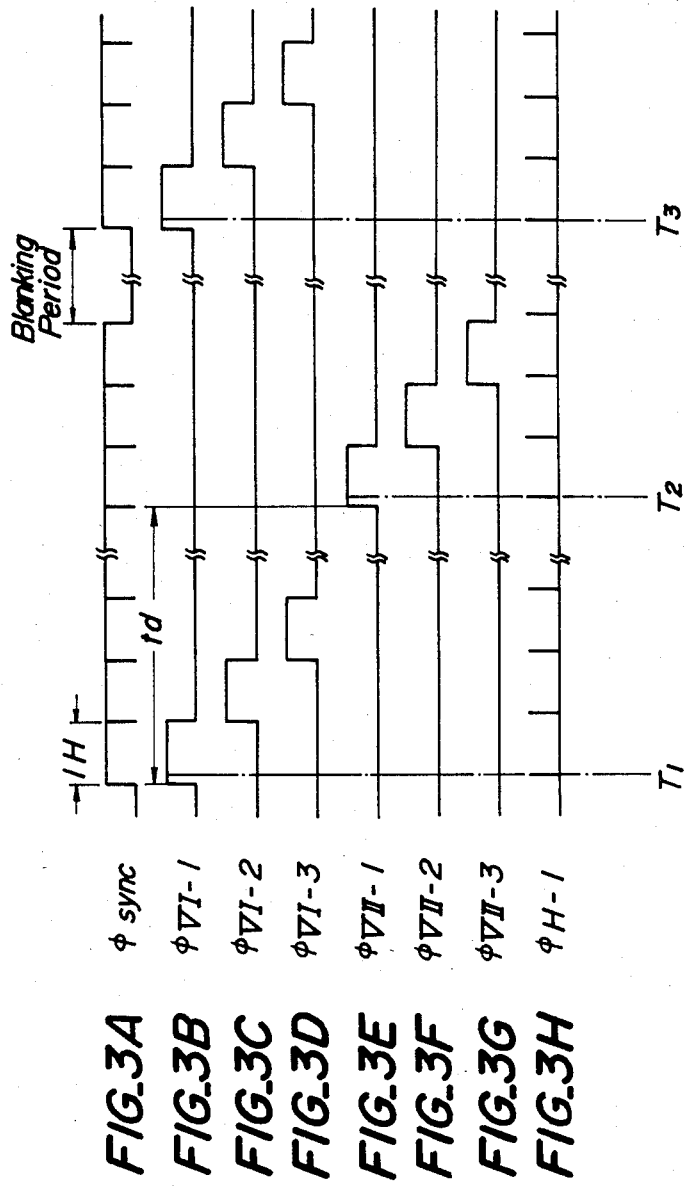
FIGS. 3A to 3H are waveforms for explaining the operation of the device shown in FIG. 2.

Now the operation of the solid state image pick-up device shown in FIG. 2 will be explained with reference to timing charts illustrated in FIGS. 3A to 3H. FIG. 3A shows a vertical synchronizing signal $\phi$sync, FIGS. 3B to 3D first vertical scanning pulses $\phi$VI supplied from the first vertical shift register 25, and FIGS. 3E to 3G illustrate second vertical scanning pulses $\phi$VII generated from the second vertical shift register 26. In the drawing, only the vertical scanning pulses for first three lines are shown and suffixes applied thereto denote line numbers. FIG. 3H represents horizontal scanning pulses $\phi$H supplied from the horizontal shift register 18. In FIG. 3H, there are shown the horizontal scanning pulses only for a first line.

Now the operation of a single picture element, e.g. the picture element 11-11 will be considered. At a time $T_1$, the first vertical selection switch 21-1 is turned on by the first vertical scanning pulse $\phi$VI-1. Then the MOS transistor 10 constituting the relevant picture element 11-11 is turned on by the horizontal scanning pulse $\phi$H-1 and therefore, the relevant photodiode 15 is reverse-biased, so that the storing operation of the signal charge is initiated. At a time $T_2$, the second vertical selection switch 22-1 is turned on by the second vertical scanning pulse $\phi$VII-1 and the relevant MOS transistor 10 is turned on again by the horizontal scanning pulse $\phi$H-1. Then the signal charge stored in the photodiode 15 is flown into the second signal read-out line 24 and the photodiode is reverse-biased again to restart the storing operation. At a time $T_3$, the first vertical selection switch 21-1 is turned on by the first horizontal scanning pulse $\phi$VI-1 and the relevant MOS transistor 10 is also made on by the horizontal scanning pulse $\phi$H-1. Then, the signal charge stored in the relevant photodiode 15 during a time period $T_3-T_2$ is read-out onto the first signal read-out line 23 and after that the photodiode 15 is reverse-biased again.

As can be understood from the above explanation, in the solid state image pick-up device according to the invention, since the signal charge stored in the photodiode 15 during time period $T_2-T_1$ can be flown away onto the second read-out line 24 at the time $T_2$, the time period during which the signal charge is stored in the photodiode 15 can be reduced to $(T_3-T_2)$, and the signal charge is read-out of the photodiode onto the first signal read-out line 23 to produce an output image signal. In the known solid state image pick-up device the signal charge storing period is fixed to $T_3-T_1=33.3$ msec. Contrary to this, according to the invention, the signal charge storing period $T_3-T_2$ can be set at will by charging a delay time $t_d$ of the second vertical scanning pulse $\phi$VII with respect to the first vertical scanning pulse $\phi$VI. According to the invention, said delay time $t_d$ can be adjusted by an integer multiple of the horizontal scanning period $H=63.5$ $\mu$sec. and thus, the signal charge storing period i.e. the shutter open time can be adjusted within a very wide range from 63.5 $\mu$sec. to 33.3 msec.

In FIG. 2, the principal construction of the solid state image pick-up device according to the invention is shown, in which the interlace scanning is omitted.

Figure 4:
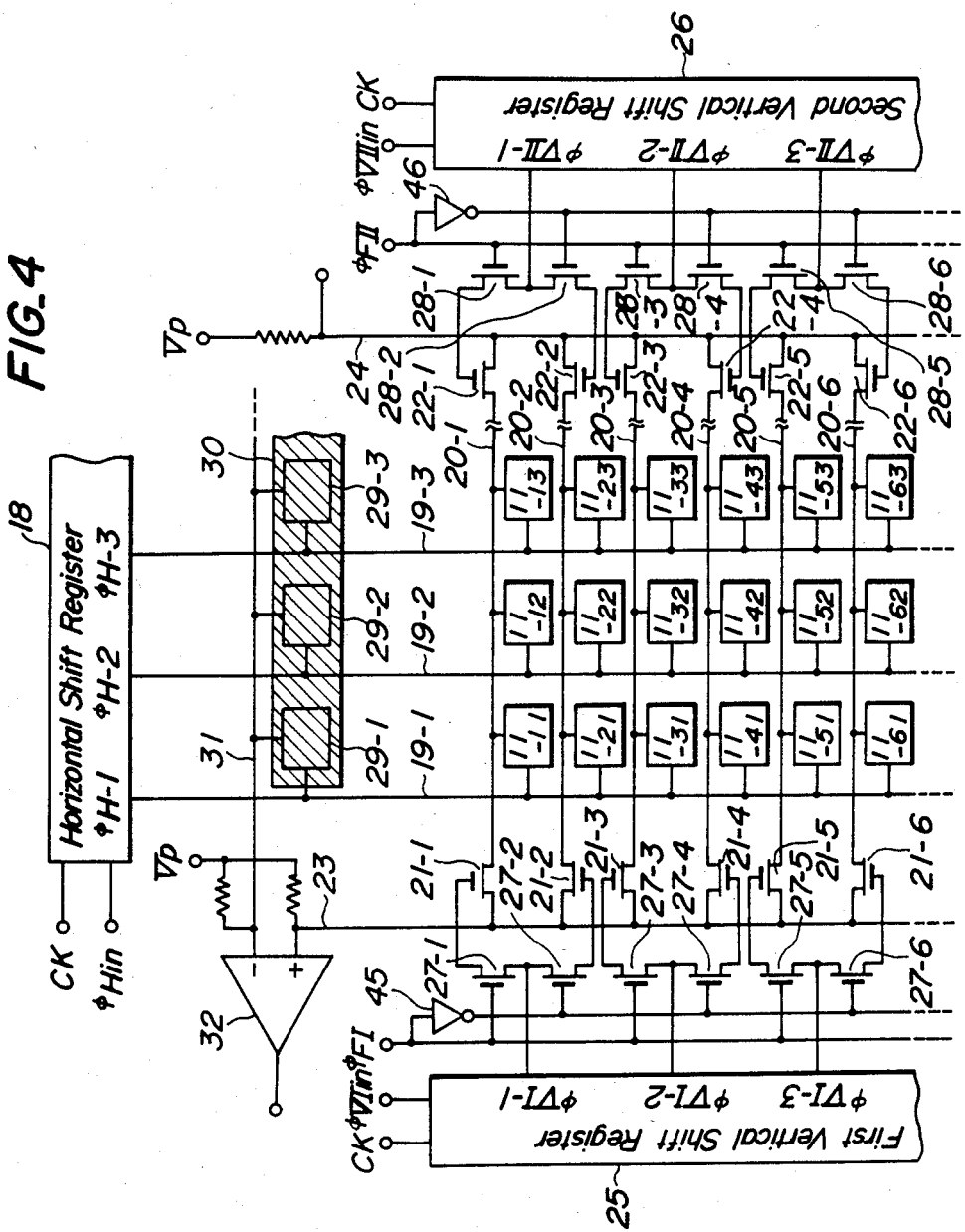
FIG. 4 is a circuit diagram illustrating an embodiment of the image-pick device according to the invention.

FIG. 4 is a circuit diagram showing an embodiment of the solid state image pick-up device in which an interlace scanning circuit is provided. In FIG. 4, picture elements 11-11, 11-12, 11-13 ... ; 11-21, 11-22, 11-23 ... ; 11-31, 11-32, 11-33 ... each constituted by a MOS transistor and a photodiode like as the previous embodiment are arranged in a matrix form and are operated selectively under the control of horizontal scanning lines 19-1, 19-2 ... and vertical scanning lines 20-1, 20-2 .... The horizontal scanning lines are connected to outputs of a horizontal shift register 18. The vertical scanning lines are connected to first and second signal read-out lines 23 and 24 through first and second vertical selection switches 21-1, 21-2 ... and 22-1, 22-2 ..., respectively. Gates of the first and second vertical selection switches are connected to outputs of first and second vertical shift registers 25 and 26, respectively by means of first and second field selection switches 27-1, 27-2, 27-3 ... and 28-1, 28-2, 28-3 ..., respectively, each of the field selection switches being formed by a MOS transistor. As illustrated in FIG. 4, each of the output pulses from the first and second vertical shift registers 25 and 26 are parallelly applied to paired field selection switches 27-1, 27-2; 27-3, 27-4; ... and 28-1, 28-2; 28-3, 28-4; .... To gates of the odd numbered first and second field selection switches 27-1, 27-3 ... and 28-1, 28-3 ... are supplied first and second field selection pulses $\phi$FI and $\phi$FII, and to the even numbered first and second selection switches 27-2, 27-4 ... and 28-2, 28-4 ... are applied inverted first and second field selection pulses $\phi$FI and $\phi$FII via inverters 45 and 46, respectively in synchronism with the line scanning period. The first field selection pulse $\phi$FI assumes a high logical level during an odd field period, and a low logical level during an even field period. The second field selection pulse $\phi$FII also has the high logical level during the odd field period and the low logical level during the even field period, but is delayed with respect to the first field selection pulse $\phi$FI by a delay time $t_d$.

In the embodiment shown in FIG. 4, in the odd field period, the field selection switches 27-1, 27-3 ... ; 28-1, 28-3 ... corresponding to the odd numbered scanning lines are made on and the vertical scanning pulses $\phi$VI and $\phi$VII are applied to the vertical scanning lines 20-1, 20-3 .... In the even field period, the field selection switches 27-2, 27-4 ... and 28-2, 28-4 ... are turned on and the vertical scanning pulses $\phi$VI and $\phi$VII are supplied to the vertical scanning lines 20-2, 20-4 .... In this manner, it is possible to carry out the interlace scanning corresponding to the standard television system. Also in this embodiment, by suitably setting the delay time $t_d$ between the first vertical scanning pulse $\phi$VI and the second vertical scanning pulse $\phi$VII as well as between the first and second field selection pulses $\phi$FI and $\phi$FII, the shutter open period can be adjusted within the very wide range from 63.5 µsec. to 33.3 msec.

Figure 5:
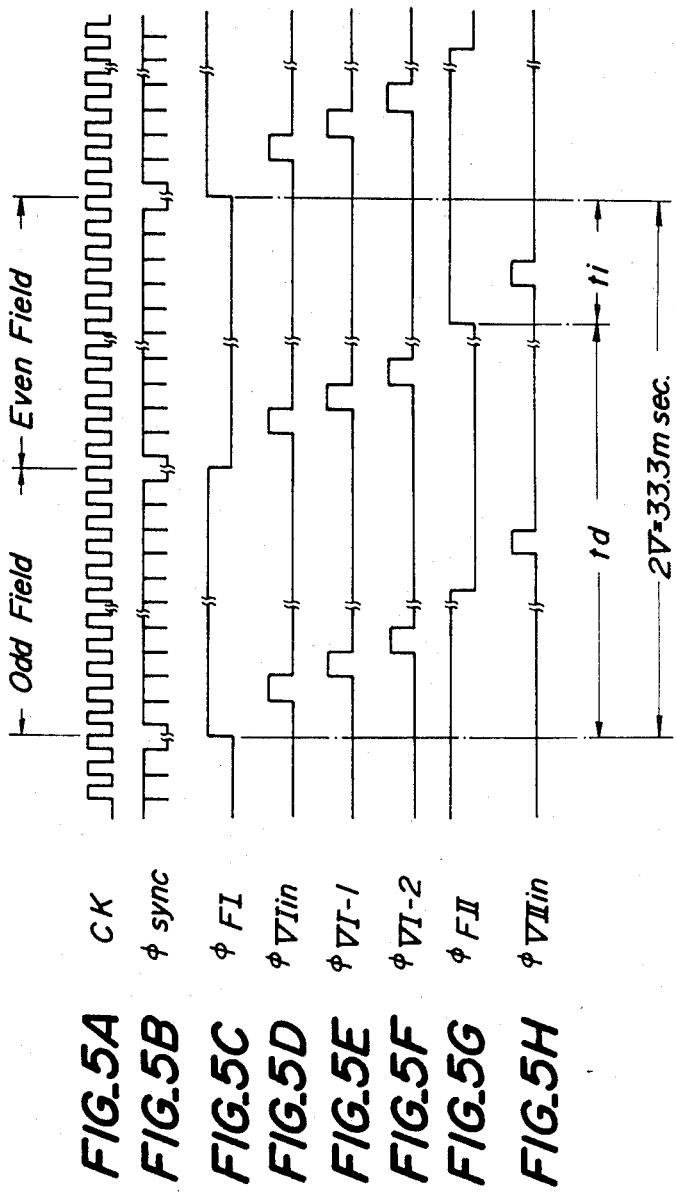
FIGS. 5A to 5H are waveforms for explaining the operation of the device depicted in FIG. 4.

FIGS. 5A to 5H show various pulses for explaining the operation of the solid state image pick-up device illustrated in FIG. 4. FIG. 5A shows clock pulses ck having a frequency fH for driving the horizontal shift register 18 and vertical shift registers 25 and 26, FIG. 5B vertical synchronizing pulses $\phi_{sync}$, FIGS. 5C and 5G first and second field selection pulses $\phi$FI and $\phi$FII, respectively, FIGS. 5D and 5H input pulses $\phi$VI$_{in}$ and $\phi$VII$_{in}$ to the first and second vertical shift registers 25 and 26, respectively and FIGS. 5E and 5F depict vertical scanning pulses $\phi$VI-1 and $\phi$VI-2 generated from the first vertical shift resister 25. As shown in the drawing, the signal charge storing period, i.e. the shutter open time $t_i$ can be expressed by $t_i = 2V - t_d$, wherein 2V is two field period, i.e. one frame period and $t_d$ is the delay time of the second field selection pulse $\phi$FII with respect to the first field selection pulse $\phi$FI and equals to a delay time of the second vertical shift register input pulse $\phi$VII$_{in}$ relative to the first vertical shift register input pulse $\phi$VI$_{in}$.

Figure 1A:
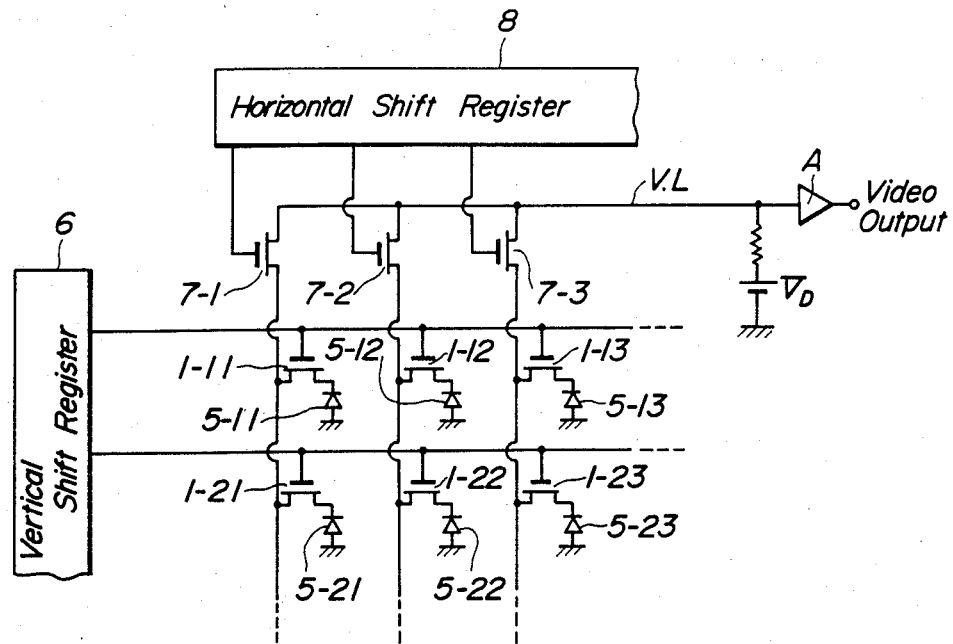
FIG. 1A is a schematic view showing a known MOS type solid state image pick-up device.
Figure 1B:
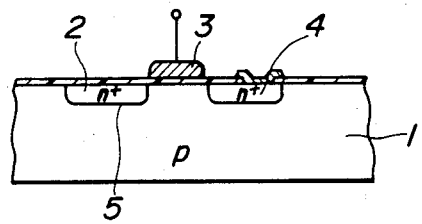
FIG. 1B is a cross sectional view illustrating a construction of a picture element of the image pick-up device shown in FIG. 1A.

In FIG. 4, the image pick-up device further comprises dummy cells 29-1, 29-2, 29-3 . . . each of which is composed of a MOS transistor and a photodiode just like as the picture element and is shielded by a light shielding layer 41. Drains of the dummy cells are connected to a noise read-out line 30 which is connected to a negative input of a differential amplifier 32 whose positive input is connected to the first signal charge read-out line 23. In this manner, from the differential amplifier 32 is derived an output image signal having spike noise due to the clock pulses removed therefrom. In the embodiments illustrated in FIGS. 2 and 4, since the horizontal scanning pulses $\phi$H are applied to the gates of the MOS transistors forming the picture elements, there may be produced rather large spike noise as compared with the known device shown in FIG. 1 in which the vertical scanning pulses $\phi$V are applied to the gates. This spike noise can be materially reduced to admissible level by means of the noise cancel circuit using the dummy cells.

It should be noted that in the above explained embodiments of the image pick-up device according to the invention, since the signal charge stored in the photodiode must be read-out during a time period in which the horizontal scanning pulses $\phi$H is in the high logical level (generally said time period is in the order of 70 n sec.), it is necessary to decrease a resistance of MOS transistor in the turn-on condition and thus, an area of MOS transistor becomes somewhat larger than the known device. However, since each picture element can be formed by a single transistor, the whole device is still sufficiently small.

Figure 6:
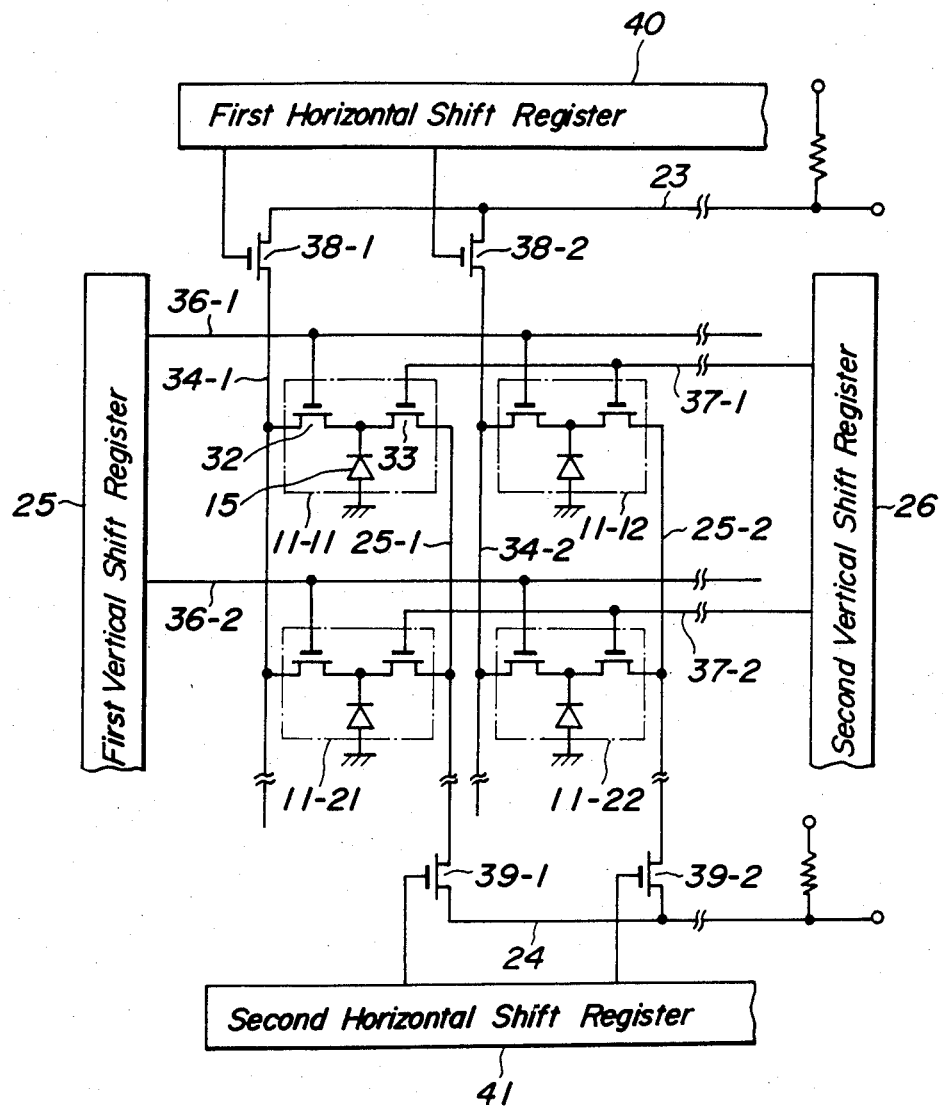
FIG. 6 is a circuit diagram showing another embodiment of the image pick-up device according to the invention.

FIG. 6 is a circuit diagram illustrating another embodiment of the solid state image pick-up device according to the invention. In this embodiment, the vertical scanning pulses $\phi$V are applied to the gates of MOS transistors forming the picture elements. Each picture element is composed of a photodiode 15 and two MOS transistors 32 and 33. Drains of the first MOS transistors 32 are connected to first horizontal scanning lines 34-1, 34-2 . . . and drains of the second MOS transistors 33 are connected to second horizontal scanning lines 35-1, 35-2 . . . . Gates of the first MOS transistors 32 are connected to first vertical scanning lines 36-1, 36-2 . . . and gates of the second MOS transistors 33 are connected to second vertical scanning lines 37-1, 37-2 . . . . The first horizontal scanning lines 34-1, 34-2 . . . are connected to a first signal read-out line 23 via first horizontal selection switches 38-1, 38-2 . . . formed by MOS transistors, and the second horizontal scanning lines 35-1, 35-2 . . . are connected to a second signal read-out line 24 via second horizontal selection switches 39-1, 39-2 . . . composed of MOS transistors. Gates of the first horizontal selection switches 38-1, 38-2 . . . are connected to outputs of a first shift register 40 and gates of the second horizontal selection switches 39-1, 39-2 . . . are connected to outputs of a second shift register 41. The first vertical scanning lines 36-1, 36-2 . . . are connected to outputs of a first vertical shift register 25 and the second vertical scanning lines 37-1, 37-2 . . . are connected to outputs of a second vertical shift register 26.

In the present embodiment, the signal charge stored in the photodiode 15 is read-out by means of the following two paths: first MOS transistor 32—first horizontal scanning line 34-1, 34-2 . . . —first signal read-out line 23, and second MOS transistor 33—second horizontal scanning line 35-1, 35-2 . . . —second signal read-out line 24. Therefore, when a time difference $t_d$ between the scanning timing by means of the first horizontal and vertical shift registers 40 and 25 and the scanning timing by means of the second horizontal and vertical shift registers 41 and 26, is suitably adjusted, it is possible to set the shutter open time $t_i$ in accordance with the equation $t_i = 2V - t_d$ like as the embodiments shown in FIGS. 2 and 4.

Figure 7:
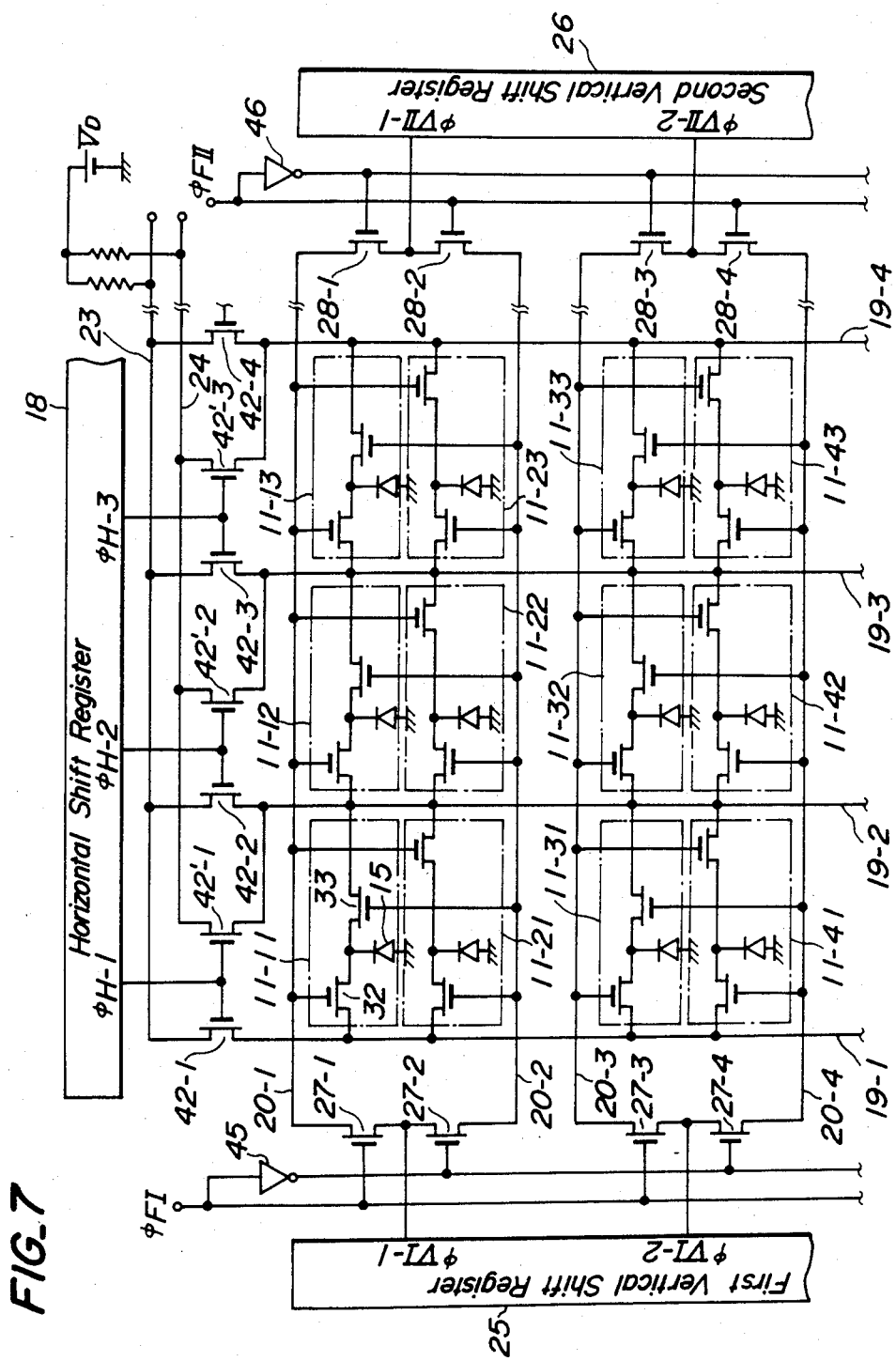
FIG. 7 is a circuit diagram illustrating still another embodiment of the image pick-up device according to the invention.

FIG. 7 illustrates still another embodiment of the solid state image pick-up device according to the invention. In the embodiment shown in FIG. 6, it is necessary to provide the horizontal and vertical scanning lines the numbers of which are twice as those of the picture elements arranged in the horizontal and vertical directions, respectively. In the present embodiment, the number of the horizontal and vertical scanning lines can be substantially equal to those of the picture elements arranged in the horizontal and vertical directions, respectively. Each picture element is formed by a photodiode 15 and two MOS transistors 32 and 33 like as the previous embodiment shown in FIG. 6. In the present embodiment, a drain of a second MOS transistor 33 of a certain picture element is commonly connected to a horizontal scanning line together with a drain of a first MOS transistor 32 of an adjacent picture element. For instance, a drain of a second MOS transistor 33 of a picture element 11-22 is connected to a horizontal scanning line 19-2 to which is also connected a drain of a first MOS transistor 32 of an adjacent picture element 11-12. To the right and left extreme horizontal scanning lines are connected only the drains of the second MOS transistors and first MOS transistors, respectively. To the horizontal scanning lines 19-2, 19-3 . . . except for the outermost ones, are connected two horizontal selection switches 42-1, 42-2 . . . and 42'-1, 42'-2 . . . , respectively, each being formed by a MOS transistor. The drains of the first and second horizontal selection switches 42-1, 42-2 . . . and 42'-1, 42'-2 . . . are connected first and second signal read-out lines 23 and 24, respectively. To each of the outermost horizontal scanning lines is connected only one horizontal selection switch whose drain is connected to the signal read-out line 23 or 24. Gates of the paired horizontal selection switches 42-1, 42'-1; 42-2, 42'-2; . . . are connected to each other and are connected outputs of a horizontal shift register 18. Gates of the first and second MOS transistors of picture elements belonging to the odd field are connected to odd and even numbered vertical scanning lines 20-1, 20-3 . . . and 20-2, 20-4 . . . , respectively. Gates of the first and second MOS transistors of the picture elements for the even field are connected to the even and odd numbered vertical scanning lines 20-2, 20-4 . . . and 20-1, 20-3 . . . , respectively. The vertical scanning lines 20-1, 20-2 . . . are connected to first and second vertical shift registers 25 and 26 via first and second field selection switches 27-1, 27-2 . . . and 28-1, 28-2 . . . , respectively. Drains of successive two field selection switches 27-1, 27-2; 27-3, 27-4; . . . and 28-1, 28-2; 28-3, 28-4; . . . are connected to each other and are connected to the outputs of the vertical shift registers 25 and 26. To gates of the field selection switches 27-1, 27-3 . . . and 28-1, 28-3 . . . belonging to the odd field, are applied field selection pulses $\phi$FI and $\phi$FII, respectively, and to gates of the field selection switches 27-2, 27-4 . . . and 28-2, 28-4 . . . belonging to the even field are applied inverted field selection pulses $\phi$FI and $\phi$FII via inverters 44 and 45, respectively.

FIGS. 8A to 8I show various pulses for explaining the operation of the solid state image pick-up device illustrated in FIG. 7 according to the invention. FIG. 8A depicts field selection pulses $\phi$FI for the first vertical shift register 25, FIGS. 8B and 8C output pulses $\phi$VI-1 and $\phi$VI-2 from first and second stages of the first vertical shift register 25, FIG. 8D field selection pulses $\phi$FII for the second vertical shift register 26, FIGS. 8E and 8F output pulses from first and second stages of the second vertical shift register 26. The pulses $\phi$FII, $\phi$VII-1 and $\phi$VII-2 are delayed by a delay time $t_d$ with respect to the pulses $\phi$FI, $\phi$VI-1 and $\phi$VI-2, respectively. FIG. 8G shows a portion A' of the first vertical scanning pulse $\phi$VI-1 illustrated in FIG. 8B and FIG. 8H depicts a portion B' of the second vertical scanning pulse $\phi$VII-1 shown in FIG. 8E. FIG. 8I illustrates output pulses $\phi$H-1 from a first stage of the horizontal shift register 18. In FIGS. 8G, 8H and 8I, the time base is much more expanded.

Now a single picture element 11-11 will be considered. At a time $T_2$, the second MOS transistor 33 is turned on by the pulses $\phi$FII and $\phi$VII-1 via the vertical scanning line 20-2. When the horizontal selection switch 42' is turned on by the horizontal scanning pulse $\phi$H-1, the horizontal scanning line 19-2 is connected to the second signal read-out line 24 and the signal charge stored in the photodiode is read-out onto the second signal read-out line 24. After that, the picture element is reset to initiate the storing operation of the signal charge. At a time $T_3$, the first transistor is turned on by the pulses $\phi$FI and $\phi$VI-1 via the vertical scanning line 20-1, and when the horizontal selection switch 42 is turned on by the pulse $\phi$H-1, the scanning line 19-1 is coupled with the first signal read-out line 23 and the signal charge stored in the photodiode 15 during the time period $t_3-T_2$ is read-out onto the first signal read-out line 23. Therefore, the shutter open time is made equal to the time period $T_3-T_2$.

All the picture elements of the device operate in the manner explained above and the shutter function having the exposure time $t_i=2V-t_d$ can be performed. In the present embodiment, since the gates of the MOS transistors are energized by the vertical scanning pulses, it is sufficient to effect the signal charge reading-out operation within the horizontal blanking period of about 10 $\mu$sec. Therefore, the MOS transistors may have a relatively large resistance in the conduction state, so that its area may be small. Further, since the gates of the resetting transistors for the odd and even numbered fields are scanned by means of the vertical scanning lines for the even and odd numbered fields, respectively, the number of the vertical scanning lines can be made equal to that of the picture elements arranged in the Y direction. Moreover, since the horizontal scanning lines are commonly used for the signal reading-out operation and the resetting operation, the number of the horizontal scanning lines can be equal to that of the picture elements arranged in the X direction plus one. Therefore, the solid-state image pick-up device of the present invention can realize the high integration and can be made extremely small.

As explained above in detail, according to the invention, since two signal read-out lines are provided and the signal charge stored in the photodiode is read-out twice during each scanning period 2V, the solid state image pick-up device has the desired electronic shutter function having a variable shutter open time. Moreover, the solid state image pick-up device according to the invention can be manufactured by the entirely same processes for manufacturing the known MOS type solid state image pick-up device and therefore, the cost for manufacture is not increased at all. As explained above, the solid state image pick-up device according to the invention comprises the two signal read-out lines and therefore, new possibilities such as video processing and photometry can be developed by using the image signal read-out onto the second signal read-out line.

What is claimed is:

1. A solid state image pick-up device comprising:
  means having a number of picture elements arranged in a matrix form, each picture element including at least one MOS transistor and a photodiode;
  horizontal scanning means connected to said picture elements for scanning horizontally the picture elements at a given horizontal scanning period;
  vertical scanning means connected to said picture elements for scanning the picture elements at a given vertical scanning period; and
  signal reading-out means including first and second signal read-out lines selectively connected to the picture elements under the control of said horizontal and vertical scanning means in such a manner that signal charges stored in the photodiodes are read-out twice within a field period to perform a shutter function having a variable shutter open time;
  wherein said horizontal scanning means comprises a plurality of horizontal scanning lines, each commonly connected to picture elements arranged in a vertical direction, and at least one horizontal shift register having outputs connected to said horizontal scanning lines successively with horizontal scanning pulses;
  wherein said vertical scanning means comprises a plurality of vertical scanning lines, each commonly connected to picture elements arranged in a horizontal direction, and first and second vertical shift registers having outputs connected to said vertical scanning lines for driving the vertical scanning lines with first and second vertical scanning pulses, respectively, said second vertical scanning pulses being delayed with respect to said first vertical scanning pulses by a given time period corresponding to said shutter open time;

wherein said vertical scanning means further comprises first vertical selection switches connected between the vertical scanning lines and the first signal read-out line and second vertical selection switches connected between the vertical scanning lines and the second signal read-out line, and said first and second vertical selection switches are driven by said first and second vertical scanning pulses respectively; and wherein said vertical scanning means further comprises first field selection switches connected to the first vertical selection switches, successive two first field selection switches being connected to respective outputs of said first vertical shift register, and second field selection switches connected to the second vertical selection switches, successive two second field selection switches being connected to respective outputs of said second vertical shift register;

every other first field selection switches are driven alternately for an odd field by first field selection pulses; and every other second field selection switches are driven alternately for an even field by second field selection pulses which are delayed with respect to the first field selection pulses by said given time period.

2. A solid state image pick-up device comprising:

means having a number of picture elements arranged in a matrix form, each picture element including at least one MOS transistor and a photodiode;

horizontal scanning means connected to said picture elements for scanning horizontally the picture elements at a given horizontal scanning period;

vertical scanning means connected to said picture elements for scanning the picture elements at a given vertical scanning period;

signal reading-out means including first and second signal read-out lines selectively connected to the picture elements under the control of said horizontal and vertical scanning means in such a manner that signal charges stored in the photodiodes are read-out twice within a field period to perform a shutter function having a variable shutter open time;

wherein said horizontal scanning means comprises a plurality of horizontal scanning lines, each commonly connected to picture elements arranged in a vertical direction, and at least one horizontal shift register having outputs connected to said horizontal scanning lines successively with horizontal scanning pulses;

wherein said vertical scanning means comprises a plurality of vertical scanning lines, each commonly connected to picture elements arranged in a horizontal direction, and first and second vertical shift registers having outputs connected to said vertical scanning lines for driving the vertical scanning lines with first and second vertical scanning pulses, respectively, said second vertical scanning pulses being delayed with respect to the first vertical scanning pulses by a given time period corresponding to said shutter open time; and wherein each of the picture elements comprises first and second MOS transistors and a photodiode;

said horizontal scanning lines are commonly connected to drains of the first MOS transistors of respective picture elements and to drains of the second MOS transistors of horizontally adjacent picture elements;

said vertical scanning lines are commonly connected to gates of the first MOS transistors of respective picture elements and to gates of the second MOS transistors of vertically adjacent picture elements; and said horizontal scanning means further comprises first and second horizontal selection switches connected between the respective horizontal scanning lines and the first and second signal read-out lines, respectively, said first and second horizontal selection switches being driven by the horizontal scanning pulses.

3. A solid state image pick-up device comprising:

means having a number of picture elements arranged in a matrix form, each picture element including at least one MOS transistor and a photodiode;

horizontal scanning means connected to said picture elements for scanning horizontally the picture elements at a given horizontal scanning period;

vertical scanning means connected to said picture elements for scanning the picture elements at a given vertical scanning period;

signal reading-out means including first and second signal read-out lines selectively connected to the picture elements under the control of said horizontal and vertical scanning means in such a manner that signal charges stored in the photodiodes are read-out twice within a field period to perform a shutter function having a variable shutter open time;

wherein said horizontal scanning means comprises a plurality of horizontal scanning lines, each commonly connected to picture elements arranged in a vertical direction, and at least one horizontal shift register having outputs connected to said horizontal scanning lines successively with horizontal scanning pulses;

said vertical scanning means comprises a plurality of vertical scanning lines, each commonly connected to picture elements arranged in a horizontal direction, and first and second vertical shift registers having outputs connected to said vertical scanning lines for driving the vertical scanning lines with first and second vertical scanning pulses, respectively, said second vertical scanning pulses being delayed with respect to the first vertical scanning pulses by a given time period corresponding to said shutter open time;

wherein said vertical scanning means further comprises first vertical selection switches connected between the vertical scanning lines and the first signal read-out line and second vertical selection switches connected between the vertical scanning lines and the second signal read-out line, and said first and second vertical selection switches are driven by said first and second vertical scanning pulses, respectively;

wherein said vertical scanning means further comprises first field selection switches connected to the first vertical selection switches, successive two first field selection switches being connected to respective outputs of said first vertical shift register, and second field selection switches connected to the second vertical selection switches, successive two second field selection switches being connected to respective outputs of said second vertical shift register;
every other first field selection switches are driven alternately for an odd field by first field selection pulses; and
every other second field selection switches are driven alternately for an even field by second field selection pulses which are delayed with respect to the first field selection pulses by said given time period.

* * * * *